United States Patent [19]

Rans

[11] 4,378,121
[45] Mar. 29, 1983

[54] SIDECAR ASSEMBLY FOR A BICYCLE

[76] Inventor: Monte Rans, 1428 Meadow Brook Dr., Round Lake Beach, Ill. 60073

[21] Appl. No.: 225,862

[22] Filed: Jan. 16, 1981

[51] Int. Cl.³ .............................................. B62K 27/02
[52] U.S. Cl. .................................................... 280/203
[58] Field of Search ................................ 280/203, 473

[56] References Cited

U.S. PATENT DOCUMENTS 1,824,675  9/1931  Linn .................................... 280/203

FOREIGN PATENT DOCUMENTS

| 103501 | 3/1938 | Australia | 280/203 |
| 10639 | 7/1902 | Austria | 280/203 |
| 539081 | 6/1922 | France | 280/203 |
| 867297 | 10/1941 | France | 280/203 |
| 15623 | of 1912 | United Kingdom | 280/203 |

*Primary Examiner*—John A. Pekar
*Attorney, Agent, or Firm*—John R. Garrett

[57] ABSTRACT

This disclosure depicts a novel sidecar for use with a bicycle. The sidecar comprises a sidecar frame having at least three attachment ends, a sidecar wheel and axle attached to one of the attachment ends of the sidecar frame, a holding means attached to the sidecar frame, and first and second securing means for attaching the sidecar frame to the bicycle. The first and second securing means are in alignment with each other such that the sidecar wheel remains in contact with the ground when the bicycle is tilted from side to side.

3 Claims, 8 Drawing Figures

SIDECAR ASSEMBLY FOR A BICYCLE

BACKGROUND OF THE INVENTION

This invention relates to sidecars for use with two-wheel vehicles and in particular to a sidecar for use with a conventional bicycle. Sidecars for bicycles have never been very popular due to the fact that they are usually too heavy and cumbersome, thereby making it difficult for the bicycle rider to be able to peddle the bicycle. They have also posed problems for the bicycle rider in cornering. The attachment means utilized with sidecars restricts the bicycle rider to very low speeds especially when attempting to corner in either left or right directions. The novel sidecar disclosed overcomes these problems in the prior art.

Objects of the Invention

It is a general object of the present invention to provide for a bicycle, a sidecar.

It is a more specific object of the present invention to provide a lightweight yet durable sidecar which is low in cost to manufacture.

It is a further object to provide a sidecar for a bicycle having an attachment means which allows the bicycle to tilt from side to side when driven around a corner.

It is yet another object of the present invention to provide attachment means for the sidecar which allows it to be quickly attached and detached from the bicycle.

BRIEF DESCRIPTION OF THE DRAWINGS

The features of the present invention which are believed to be novel are set forth with particularity in the appended claims. The invention together with further objects and advantages may best be understood by reference to the following description taken in conjunction with the accompanying drawings, in the several figures of which like reference numerals identify like elements, and in which:

DESCRIPTION OF THE PREFERRED EMBODIMENT

Figure 1:
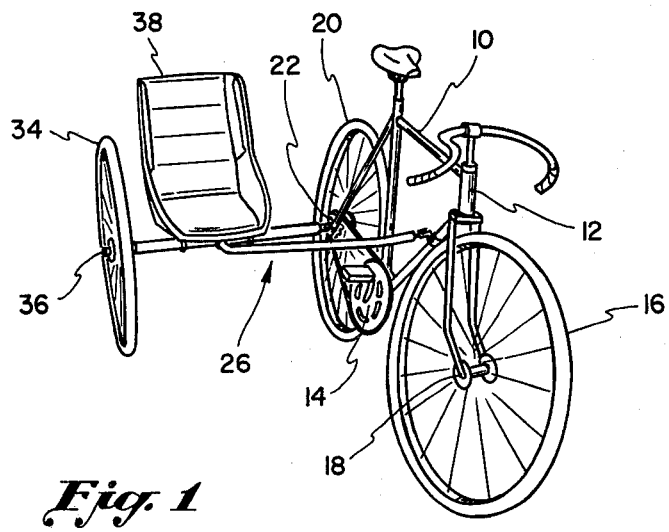
FIGS. 1 and 2 are perspective views of the novel sidecar attached to a bicycle.
Figure 2:
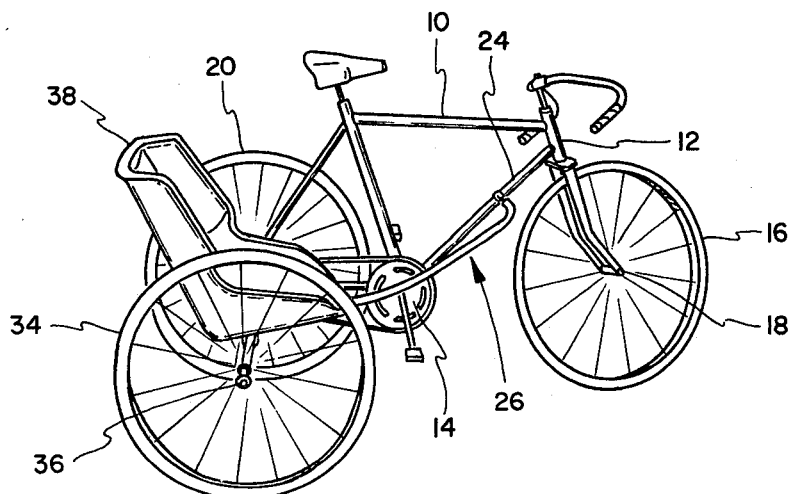

Whereas the invention may be utilized in various applications, it is preferably embodied in a sidecar for use with a bicycle of the type shown in FIGS. 1 and 2. In the prior art bicycle sidecars have typically been either too heavy or the means of attachment to the bicycle did not allow ease in cornering when the bicycle was ridden. The present invention overcomes these problems in the prior art.

In general terms the present invention involves a sidecar for use with a bicycle comprising a sidecar frame having at least three attachment ends. The first and second attachment ends are on one side of the frame and a third attachment end is on the opposite side of the frame. The sidecar also comprises a sidecar wheel and axle attached to the third attachment end of the sidecar frame. A holding means is provided and attached to the sidecar frame. The sidecar further comprises a first securing means for attaching the first attachment end of the sidecar frame to the bicycle and a second securing means for attaching the second attachment end of the sidecar frame to the bicycle. The second securing means is in alignment with the first securing means. The alignment of the first and second securing means allows the sidecar wheel to remain on the ground when the bicycle is tilted to either side.

The present invention will now be described in detail. The novel sidecar is shown in FIGS. 1 through 4 and is for use with a bicycle having a frame 10 for supporting a steering means 12, a pedal drive assembly 14, a front wheel and axle 16 and 18, and a rear wheel and axle 20 and 22. The frame 10 has an upward extending bar 24 connected between the pedal drive assembly 14 and the steering assembly 12.

Figure 7:
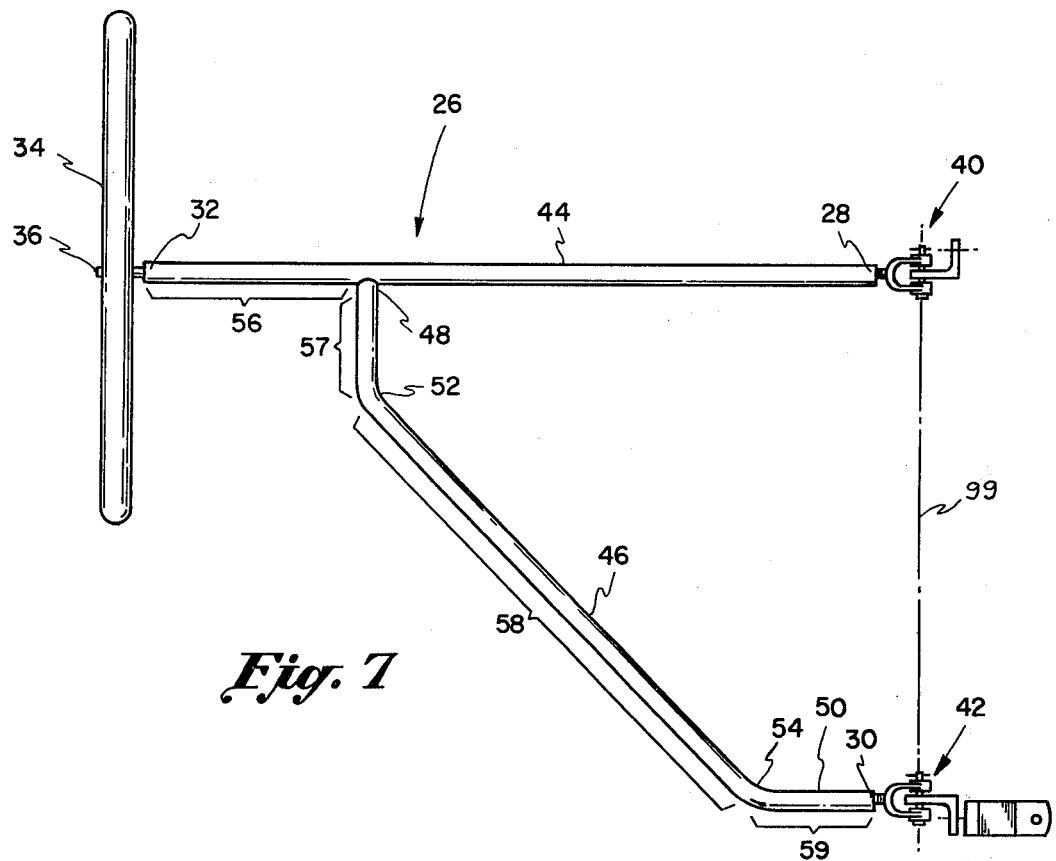
FIG. 7 is a top view of the frame of the sidecar and the attachment means to the bicycle.

Referring now also to FIG. 7, the novel sidecar has a sidecar frame 26 with at least three attachment ends. First and second attachment ends 28 and 30 are on one side of the frame 26 and a third attachment end 32 is on the opposite side of the frame 26. A sidecar wheel and axle 34 and 36 are attached to the third attachment end 32 of the sidecar frame 26. The sidecar wheel 34 has a diameter substantially equal to the diameter of the rear wheel 20 of the bicycle and is also in axial alignment with the rear wheel 20 of the bicycle. A holding means 38 is attached to the sidecar frame 26. The holding means 38 may be a seat as illustrated in the preferred embodiment or may also be any type of device or structure for carrying objects.

A first securing means 40 is attached to the first attachment end 28 of the sidecar frame 26 for attaching the sidecar frame 26 to the bicycle frame 10 and the rear axle 22 of the bicycle. A second securing means 42 is provided for attaching the second attachment end 30 of the sidecar frame 26 to the upward extending bar 24 of the bicycle frame 10. The second securing means 42 is in a predetermined alignment with the first securing means 40. The alignment of the first and second securing means 40 and 42 allows the sidecar wheel 34 to remain in contact with the ground when the bicycle is tilted to either side.

Figure 3:
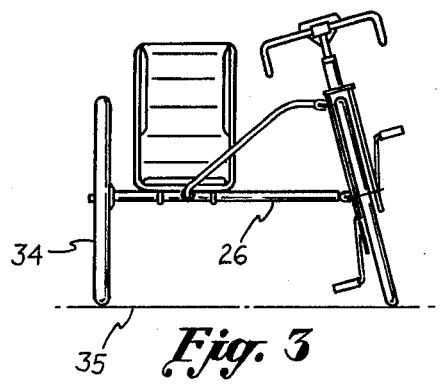
FIGS. 3 and 4 are perspective head-on views of the novel sidecar attached to a bicycle illustrating the ability of the bicycle to be tilted.
Figure 4:
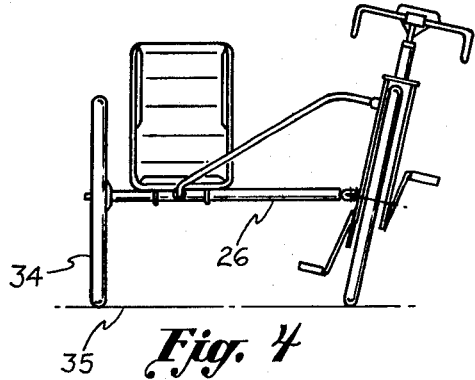

FIGS. 3 and 4 illustrate how, as the bicycle is tilted either to the right or to the left, the sidecar wheel 34 remains in contact with the ground 35 and the sidecar frame 26 remains parallel to the ground 35. This is important in providing ease of riding the bicycle when cornering. With the novel sidecar attached to the right-side of the bicycle, and if the securing means 40 and 42 were rigid or if they were not in alignment as the bicycle makes a left turn, there would be a tendency to pick the sidecar wheel 34 up off the ground 35 creating forces on the bicycle and requiring significantly more work for the person riding the bicycle. When the bicycle would be making a righthand turn it would not be possible for the bicycle to be tilted and again forces would be created on the bicycle making it difficult to ride.

As illustrated in FIG. 7, the sidecar frame 26 comprises an axle bar 44 having a first attachment end 28 and a third attachment end 32. The sidecar frame 26 further comprises a support bar 46 having a first end 48 attached to a predetermined intermediate location on the axle bar 44. A second end 50 of the support bar 46 is the second attachment end 30 of the sidecar frame 26.

The support bar 46 has at least one predetermined bend and in the preferred embodiment, as shown in FIG. 7, the support bar 46 has two substantially 45° bends 52 and 54 resulting in the ends of the support bar 46 being in substantially 90° relationship. The support bar 46 and the axle bar 44 lie in a flat plane. In the preferred embodiment the sidecar frame 26 has the following dimensions: the axle bar 44 has a length of approximately 23 inches, the portion 56 has a length of approximately 9 inches, section 57 of the support bar 46 has a length of approximately 16 inches, section 58 has a length of approximately 19 inches, and section 59 has a length of approximately 2½ inches.

Figure 5:
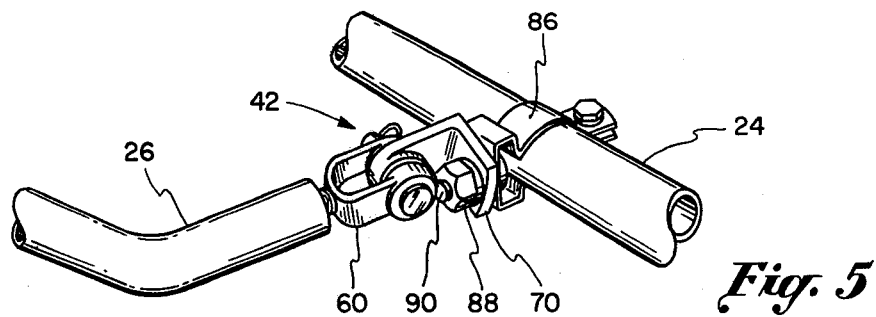
FIGS. 5 and 6 illustrate the attachment means of the sidecar to the bicycle.
Figure 6:
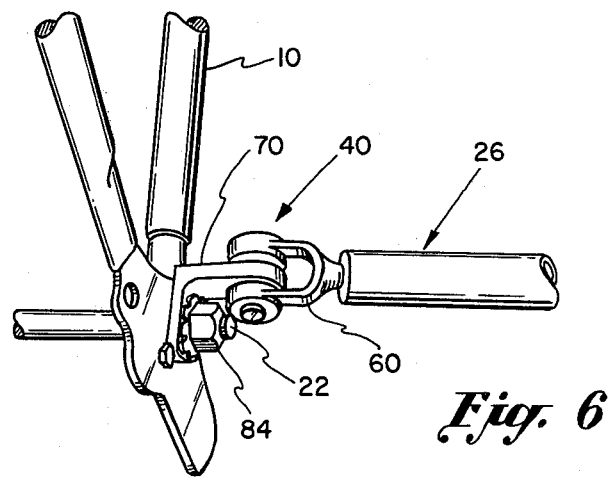
Figure 8:
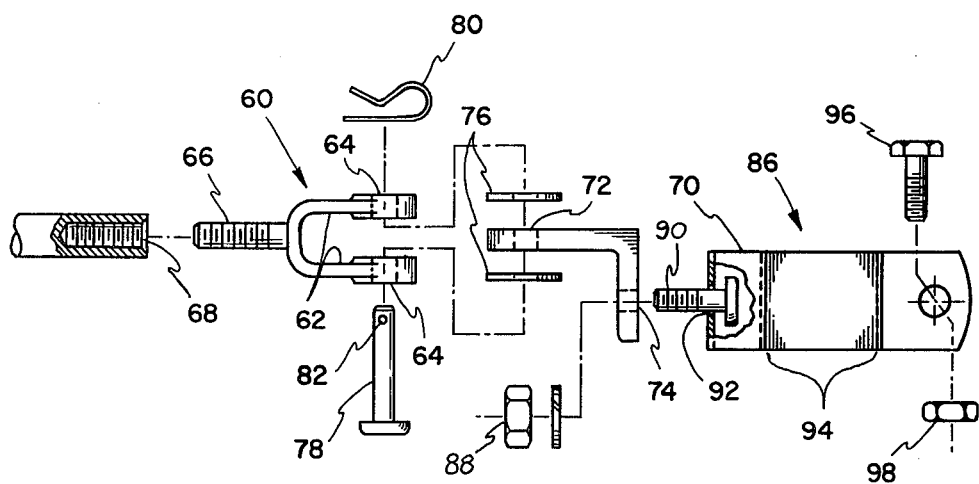
FIG. 8 is an exploded perspective view of the sidecar-bicycle attachment means.

Referring now to FIGS. 5, 6 and 8, the first securing means 40 and the second securing means 42 will be described in detail. The following elements are common to both the first and second securing means 40 and 42. A yoke 60 has a pair of arms 62 with inline apertures 64 and a threaded rod 66 attached to the arms 62. The threaded rod 66 is received in a threaded hole 68 in the first attachment end 28 and also the second attachment end 30 of the sidecar frame 26. A substantially right angle bracket 70 is provided with a first aperture 72 in one end of the bracket 70 and a second aperture 74 in the other end of the bracket 70. A nut (not shown) may be provided for securing the yoke 60 to the first or second attachment end 28 and 30 for preventing rotation of the yoke 60 once it has been correctly positioned. A pair of washers 76 are provided with a washer being placed on either side of the aperture 72 of the right angle racket 70. The right angle bracket 70 is pivotally attached to the yoke 60 with a pin 78. The pin 78 is retained in place by clip 80 which engages a hole 82 in one end of the pin 78.

As shown in FIG. 6, the right angle bracket 70 is attached to the bicycle frame 10 and rear axle 22 of the bicycle by placing aperture 74 in the right angle bracket 70 over the rear axle 22 of the bicycle and retaining it in position by tightening nut 84 of the bicycle. The first securing means 40 may be correctly positioned by rotating the securing means 40 in relation to both the bicycle frame 10 and the sidecar frame 26. In addition to the elements already described, the second securing means 42 further includes a clamp 86 for attachment to the upward extending bar 24 of the bicycle frame 10. The right angle bracket 70 is attached to the clamp 86 by means of a nut and bolt 88 and 90 which pass through aperture 92 of the clamp 86 and aperture 74 of the right angle bracket 70. In the preferred embodiment the upward extending bar 24 has a circular cross-section and therefore the clamp 86 is designed in portion 94 to securely clamp about the upward extending bar 24 and is held in place by nut and bolt 96 and 98. The second securing means 42 may be properly oriented by rotating the second securing means 42 with respect to the upward extending bar 42 of the bicycle frame 10 and the clamp 92 and also with respect to the sidecar frame 26.

For proper operation it is important that the first securing means 40 be in alignment with the second securing means 42. The proper alignment is obtained when the aperture 72 of the right angle bracket 70 and the apertures 64 in the pair of arms 62 of the yoke 60 of the first securing means 40 lie on a common straight line 99 with the corresponding elements of the second securing means 42. In other words, the pin 78 in the first securing means 40 will lie on a common straight line with the pin 78 in the second securing means 42. In affect the yokes 60 will be able to rotate about the right angle brackets 70 as if a long solid straight bar were extending through the corresponding apertures 64 and 72. The pins 78 and clips 80 are utilized so that the sidecar may be quickly attached or detached from the bicycle without disrupting the proper alignment.

The invention is not limited to the particular details of the apparatus depicted and other modification applications are contemplated. Certain other changes may be made in the above described apparatus without departing from the true spirit and scope of the invention herein involved. It is intended therefore that the subject matter in the above depiction shall be interpreted as illustrative and not in a limiting sense.

The invention is claimed as follows:

1. A sidecar for use with a bicycle having a frame for supporting a steering means, a pedal drive assembly and front and rear wheels and axles, the frame having an upward extending bar connected between the pedal drive assembly and the steering assembly, said sidecar comprising:

a sidecar frame having an axle bar with first and second ends, said first end having a threaded hole, said sidecar frame also having a support bar having first and second ends, said first end being attached to a predetermined intermediate location on said axle bar near said second end, said location being approximately two-fifths of the distance from the second end to the first end of said axle bar, said support bar having two bends of approximately 45° such that said first and second ends are in a substantially parallel relationship and said second end having a threaded hole, said support bar and said axle bar lying in a flat plane;

a sidecar wheel and axle attached to said second end of said axle bar of said sidecar frame, said sidecar wheel having a diameter substantially equal to the diameter of the rear wheel of the bicycle and also being in axial alignment with the rear wheel of the bicycle;

a holding means attached to said sidecar frame;

a first securing means for attaching said first end of said axle bar to the rear axle and frame of the bicycle, said first securing means comprising a yoke having a pair of arms with inline apertures and a threaded rod attached to said arms and extending in an opposite direction from said arms, said first end of said axle bar of said sidecar frame with said threaded hole receiving said threaded rod of said yoke, and a substantially right angle bracket with apertures in each end of said bracket, one end of said right angle bracket being attached to the rear axle and frame of the bicycle and the other end of said angle bracket being pivotably attached to said arms of said yoke with a pin and retaining clip;

a second securing means for attaching the second end of said support bar of said sidecar frame to the upward extending bar of the bicycle frame, said second securing means comprising a yoke having a pair of arms with inline apertures and a threaded rod attached to said arms and extending in an opposite direction from said arms, said second end of said support bar of said sidecar frame with said threaded hole receiving said threaded rod of said yoke, a substantially right angle bracket having first and second ends with apertures in each end of said bracket, a first end of said angle bracket being pivotably attached to said arms of said yoke with a pin and retaining clip, and a clamp for attaching to the upward extending bar of the bicycle and also attached to said second end of said angle bracket; and wherein said first securing means is in alignment with said second securing means such that said apertures in said angle brackets and yokes of said first and second securing means are all aligned in a common straight line thereby allowing said sidecar wheel to remain in contact with the ground when the bicycle is tilted.

2. A sidecar for use with a bicycle having a frame for supporting a steering means, a pedal drive assembly and front and rear wheels and axles, the frame having an upward extending bar connected between the pedal drive assembly and the steering assembly, said sidecar comprising:

a sidecar frame having at least three attachment ends, first and second attachment ends being on one side of said frame and a third attachment end being in the opposite side of said frame;

a sidecar wheel and axle attached to said third attachment end of said sidecar frame, said sidecar wheel having a diameter substantially equal to the diameter of the rear wheel of the bicycle and also being in axial alignment with the rear wheel of the bicycle;

a holding means attached to said sidecar frame;

a first securing means for attaching said first attachment end of said sidecar frame to the bicycle frame and the axle of the rear wheel of the bicycle, said first securing means consisting of a yoke having a pair of arms with inline apertures and a threaded rod attached to said arms and extending in an opposite direction from said arms, and a substantially right angle bracket with aperatures in each end of said bracket, one end of said right angle bracket being attached to the rear axle and frame of the bicycle and the other end of said angle bracket being pivotably attached to said yoke with a pin and retaining clip, and also wherein said first attachment end of said sidecar frame has a threaded hole for receiving said threaded rod of said yoke;

a second securing means for attaching said second attachment end of said sidecar frame to said upward extending bar of said bicycle frame, said second securing means being in a predetermined alignment with said first securing means; and wherein said alignment of said first and second securing means allows said sidecar wheel to remain in contact with the ground when the bicycle is tilted.

3. A sidecar for use with a bicycle having a frame for supporting a steering means, a pedal drive assembly and front and rear wheels and axles, the frame having an upward extending bar connected between the pedal drive assembly and the steering assembly, said sidecar comprising;

a sidecar frame having at least three attachment ends, first and second attachment ends being on one side of said frame and a third attachment end being on the opposite side of said frame;

a sidecar wheel and axle attached to said third attachment end of said sidecar frame, said sidecar wheel having a diameter substantially equal to the diameter of the rear wheel of the bicycle and also being in axial alignment with the rear wheel of the bicycle;

a holding means attached to said sidecar frame;

a first securing means for attaching said first attachment end of said sidecar frame to the bicycle frame and the axle of the rear wheel of the bicycle;

a second securing means for attaching said second attachment end of said sidecar frame to said upward extending bar of said bicycle frame, said second securing means being in a predetermined alignment with said first securing means, said second securing means consisting of a yoke having a pair of arms with inline apertures and a threaded rod attached to said arms and extending in an opposite direction from said arms, a substantially right angle bracket having first and second ends with apertures in each end of said bracket, a first end of said angle bracket being pivotably attached to said yoke with a pin and retaining clip, and a clamp for attaching to the upward extending bar of the bicycle and also attached to said second end of said angle bracket, and also wherein said second attachment end of said sidecar frame has a threaded hole for receiving said threaded rod of said yoke; and wherein said alignment of said first and second securing means allows said sidecar wheel to remain in contact with the ground when the bicycle is tilted.

* * * * *